US012385302B2

(12) United States Patent
Rudolph

(10) Patent No.: US 12,385,302 B2
(45) Date of Patent: Aug. 12, 2025

(54) GATE HINGE

(71) Applicant: Bart Rudolph, Kevil, KY (US)

(72) Inventor: Bart Rudolph, Kevil, KY (US)

( * ) Notice: Subject to any disclaimer, the term of this patent is extended or adjusted under 35 U.S.C. 154(b) by 91 days.

(21) Appl. No.: 18/360,006

(22) Filed: Jul. 27, 2023

(65) Prior Publication Data

US 2025/0034924 A1 Jan. 30, 2025

(51) Int. Cl.
*E05D 1/06* (2006.01)
*E05D 7/04* (2006.01)

(52) U.S. Cl.
CPC ...... *E05D 7/043* (2013.01); *E05D 2007/0446* (2013.01); *E05Y 2600/61* (2013.01); *E05Y 2900/40* (2013.01)

(58) Field of Classification Search
CPC ........... E05D 7/06; E05D 7/04; E05D 7/0423; E05D 7/1044; E05D 7/043; E05D 7/0438; E05D 7/0446; E05D 3/02; E05D 11/1014; E05D 15/581; E05D 2007/0461; E05D 2007/0484; E05D 2007/0438; E05D 2007/0446; E05D 2015/587; E05Y 2600/61; E05Y 2600/62; E05Y 2600/622; E05Y 2900/40; E05Y 2900/402; E06B 9/04; E06B 11/022; E06B 11/02; E06B 11/04; E06B 2009/002
See application file for complete search history.

(56) References Cited

U.S. PATENT DOCUMENTS 1,095,989 A * 5/1914 Scholes ..................... E05D 5/04 16/384
1,188,302 A 6/1916 Mohns
1,232,225 A * 7/1917 Clements ................ E05F 1/068 16/311

(Continued)

FOREIGN PATENT DOCUMENTS

CH 104280 A 4/1924
DE 7525507 U 2/1976

(Continued)

OTHER PUBLICATIONS

Product Sheet; "7 Shape / L Shape Screw Hooks Self-Tapping Screws Hooks Gold Color Copper"; Sold by MroMax68 on eBay; Accessed Nov. 20, 2022; 7 pages.

(Continued)

*Primary Examiner* — Chuck Y Mah
(74) *Attorney, Agent, or Firm* — CANTOR COLBURN LLP

(57) ABSTRACT

Gate hinges include an anchor shaft defining a shaft axis that extends between a first end and a second end. A first support arm is arranged at a position closer to the first end than the second end and extends in a direction normal to the shaft axis from the anchor shaft and a second support arm is arranged at the same axial position as the first support arm along the anchor shaft and extends in a direction opposite the first support arm. The anchor shaft includes a first thread and a second, self-tapping thread. The first thread is arranged along the anchor shaft for an axial length between the first (Continued)

and second support arms and the second thread and the second thread extends axially from the first thread to a tip of the anchor shaft at the second end.

19 Claims, 5 Drawing Sheets

(56) References Cited

U.S. PATENT DOCUMENTS

| | | | | |
|---|---|---|---|---|
| 1,261,713 | A * | 4/1918 | Crook | E05D 7/105 16/266 |
| 1,345,559 | A | 7/1920 | Slauson | |
| 1,417,758 | A * | 5/1922 | McLaughlin | E06B 11/04 16/384 |
| 1,423,321 | A * | 7/1922 | Hacker | E05D 7/04 16/248 |
| 1,467,029 | A | 9/1923 | Durham | |
| 1,469,425 | A | 10/1923 | Mehanna | |
| 1,731,028 | A | 10/1929 | Soss | |
| 2,837,760 | A | 6/1958 | Ware | |
| 3,107,390 | A * | 10/1963 | Shelton | E06B 11/04 248/219.3 |
| 3,116,911 | A | 1/1964 | Dragunas et al. | |
| 3,295,158 | A | 1/1967 | Hotchkiss, Jr. et al. | |
| 3,811,149 | A * | 5/1974 | Griffin | E05D 7/0423 16/253 |
| 3,861,269 | A * | 1/1975 | Laverty | F16B 25/0057 411/413 |
| 4,010,504 | A * | 3/1977 | Griffin | E05D 7/04 16/252 |
| 5,716,041 | A * | 2/1998 | Groves | E06B 11/02 49/55 |
| 6,073,396 | A | 6/2000 | Kietzmann | |
| 6,591,451 | B2 | 7/2003 | Gruber et al. | |
| 8,286,305 | B2 * | 10/2012 | Singleton | E05D 7/04 16/253 |
| 8,413,300 | B1 | 4/2013 | Luneborg | |
| 10,422,155 | B2 * | 9/2019 | Goedecke | E04H 17/1417 |
| 11,359,426 | B2 | 6/2022 | Davis | |
| 2008/0222842 | A1 | 9/2008 | Faber | |
| 2008/0301905 | A1 * | 12/2008 | Forrest | E05D 5/16 16/50 |
| 2012/0090136 | A1 * | 4/2012 | Fields | E05D 7/1044 16/386 |
| 2013/0302110 | A1 * | 11/2013 | Park | F16B 25/0063 411/387.1 |
| 2016/0290381 | A1 * | 10/2016 | Park | F16B 25/0063 |
| 2019/0219090 | A1 * | 7/2019 | Stager | F16B 25/106 |
| 2022/0195767 | A1 * | 6/2022 | McBurney | E06B 11/022 |
| 2022/0381074 | A1 * | 12/2022 | Davis | E05D 5/10 |

FOREIGN PATENT DOCUMENTS

| | | | | |
|---|---|---|---|---|
| DE | 20116172 | U1 * | 12/2001 | E05D 3/022 |
| DE | 102004063884 | A1 | 10/2005 | |
| EP | 3770365 | A1 | 1/2021 | |
| FR | 2954387 | A1 | 6/2011 | |
| FR | 3073241 | A1 * | 5/2019 | |
| GB | 2193249 | A | 11/1990 | |
| WO | WO-9204520 | A * | 3/1992 | E05D 7/043 |

OTHER PUBLICATIONS

Product Sheet; "Custom L Type Self Tapping Screw Wood Hook Screw"; Taizhou Hongchuang Hardware Co., Ltd. ("HCH Hardware"); Accessed Nov. 20, 2022; 10 pages.

Product Sheet; "Factory Direct Selling Zinc Plated L Type Wood Screw Hook Eye Seven-shaped L-shaped Right-angle Self-tapping Wood Screws"; by Anchor Bolts Products on Alibaba; Accessed Nov. 20, 2022; 9 pages.

Product Sheet; "Gate Hinge Bolts"; from FarmRanchStore.com; Accessed Nov. 20, 2022; 7 pages.

Product Sheet; "Hafele Ball Point Wall Hook / Self-tapping Screw Mount"; by ClosetMasters1 on YouTube; Accessed Nov. 20, 2022; 2 pages.

Product Sheet; "J Bold With Washers & Nuts 5/8"×12"—Zind"; from Springcreekproducts.com; Accessed Nov. 20, 2022; 2 pages.

Product Sheet; "J-Bold Post Hinge 6"-hinge Bolts Thru The Post Includes Nuts-J-Bolt Hinge has 5/8" Male Pin-Fence Bolt Through Post Hinge—Quantity 2"; from Jake Sales Store on Amazon.com; Accessed Nov. 20, 2022; 8 pages.

Product Sheet; "L Shape Threaded Mechanical Fasteners / Self Tapping Square Bend Screw Hooks"; Brand: FLRS or OEM; Mfg.:Shaanxi Flourish Industrial Co.,Ltd.; Accessed Nov. 20, 2022; 5 pages.

Product Sheet; "National Hardware N131-136 295 Screw Hook/Eye Hinges in Zinc Plated, 2 Pack, 1/2"×4""; from Amazon.com; Accessed Nov. 20, 2022; 8 pages.

Product Sheet; "Screw Hooks With Cross Slot Heavy Duty Galvanised Steel Self Tapping Wood"; from eBay; Accessed Nov. 20, 2022; 5 pages.

Product Sheet; "SpeeCo Gate Hinge Kit, 1-3_4_-77007"; from Blains Farm & Fleet; Accessed Nov. 20, 2022; 5 pages.

* cited by examiner

GATE HINGE

BACKGROUND

The subject matter disclosed herein generally relates to gate hinges and, more particularly, to gate hinges for supporting swinging gates and the like with improved installation thereof.

Gates, and in particular gates used with fencing to provide access to a field or enclosure are well-known, it being typically desired to have the gate level to preserve the swinging function of the gate (e.g., avoid dragging the gate on the ground). Two hinges (e.g., upper and lower hinges) are typically used to support the gate on a support post and enable the gate to swing relative to the support post. Conventionally, a hinge is provided with a gate or other swinging structure and enables adjustment of the orientation of the gate in at least two different gate positions (e.g., open & closed). Gate hinges are designed to ensure that the gate remains level in the closed position and is able to be opened from the closed position. Some gate hinges are designed to allow for the gate to be raised or lowered at an end opposite the hinge during swinging. The hinges and/or the support posts may move out of alignment over time, such as due to listing in soil, loosening of fasteners or engagement between a hinge and a support post, or the like. Accordingly, improved gate hinges are desirable to increase operational life and ease of use.

SUMMARY

According to some embodiments, a gate hinge includes an anchor shaft defining a shaft axis that extends between a first end and a second end, a first support arm arranged at a position closer to the first end than the second end, wherein the first support arm extends in a direction normal to the shaft axis from the anchor shaft, and a second support arm arranged at a same axial position as the first support arm along the anchor shaft and extends in a direction opposite the first support arm. The anchor shaft includes a first thread and a second thread, wherein the second thread is formed on the anchor shaft and extends to the second end of the anchor shaft, wherein the first thread is formed along the anchor shaft for at least a portion of an axial length between the first and second support arms and the second thread, and the second thread extends axially from the first thread to a tip of the anchor shaft, and wherein the second thread comprises a self-tapping thread.

In addition to one or more of the features described herein, or as an alternative, further embodiments of the gate hinge may include that the first thread has a thread pitch that is greater than a thread pitch of the second thread.

In addition to one or more of the features described herein, or as an alternative, further embodiments of the gate hinge may include that the anchor shaft comprises an intermediate portion extending from a junction between the first and second support arms and the anchor shaft to an end portion.

In addition to one or more of the features described herein, or as an alternative, further embodiments of the gate hinge may include that the first thread is arranged on the intermediate portion and the second thread is arranged on the end portion.

In addition to one or more of the features described herein, or as an alternative, further embodiments of the gate hinge may include that the intermediate portion comprises an unthreaded section and the first thread, wherein the unthreaded section is arranged between the junction and the first thread.

In addition to one or more of the features described herein, or as an alternative, further embodiments of the gate hinge may include that the end portion comprises a tapering section that ends at the tip.

In addition to one or more of the features described herein, or as an alternative, further embodiments of the gate hinge may include that the tapering portion includes at least a portion of the second thread.

In addition to one or more of the features described herein, or as an alternative, further embodiments of the gate hinge may include a seat at a base of each of the first support arm and the second support arm, wherein the base is defined where the respective support arm joins the anchor shaft.

In addition to one or more of the features described herein, or as an alternative, further embodiments of the gate hinge may include that each seat is integrally formed with the material of the respective support arm and the anchor shaft.

In addition to one or more of the features described herein, or as an alternative, further embodiments of the gate hinge may include that each seat is a separate element installed to the respective support arm.

In addition to one or more of the features described herein, or as an alternative, further embodiments of the gate hinge may include a pin hole arranged at a distal end of each of the first support arm and the second support arm.

In addition to one or more of the features described herein, or as an alternative, further embodiments of the gate hinge may include that the anchor shaft continuously tapers from a base of the first and second support arms to the tip.

In addition to one or more of the features described herein, or as an alternative, further embodiments of the gate hinge may include that first end comprises a tool-engagement feature and the second end comprises a post-engagement feature.

In addition to one or more of the features described herein, or as an alternative, further embodiments of the gate hinge may include that the tool-engagement feature comprises a tool head.

In addition to one or more of the features described herein, or as an alternative, further embodiments of the gate hinge may include that the tool-engagement feature comprises a recess formed in the first end.

In addition to one or more of the features described herein, or as an alternative, further embodiments of the gate hinge may include that the post-engagement feature comprises the second thread, and wherein the second thread is a self-tapping thread.

In addition to one or more of the features described herein, or as an alternative, further embodiments of the gate hinge may include that the anchor shaft comprises a section of uniform diameter and a section that tapers to the tip.

In addition to one or more of the features described herein, or as an alternative, further embodiments of the gate hinge may include that the anchor shaft is formed from chromium vanadium steel.

In addition to one or more of the features described herein, or as an alternative, further embodiments of the gate hinge may include a tool head at the first end, wherein the tool head extends axially in a direction away from the first and second support arms and opposite the tip.

In addition to one or more of the features described herein, or as an alternative, further embodiments of the gate hinge may include that the first thread and the second thread have equal axial lengths along the anchor shaft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
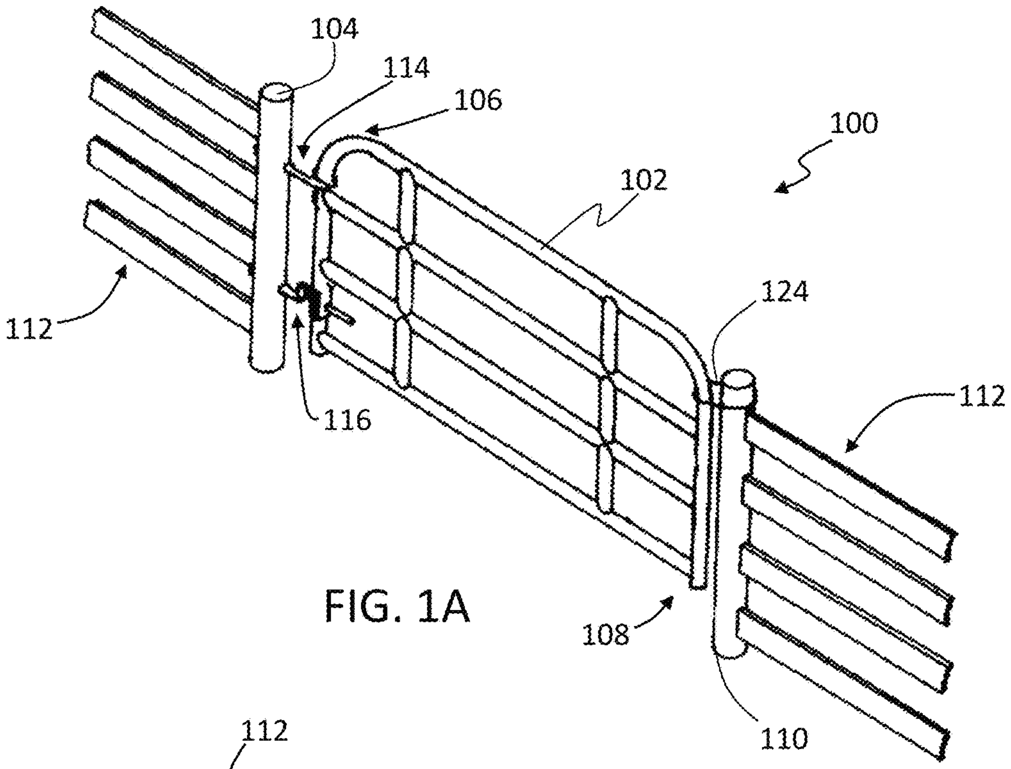
FIG. 1A is a schematic illustration of a gate system, shown in a closed state, that may incorporate embodiments of the present disclosure.
Figure 1B:
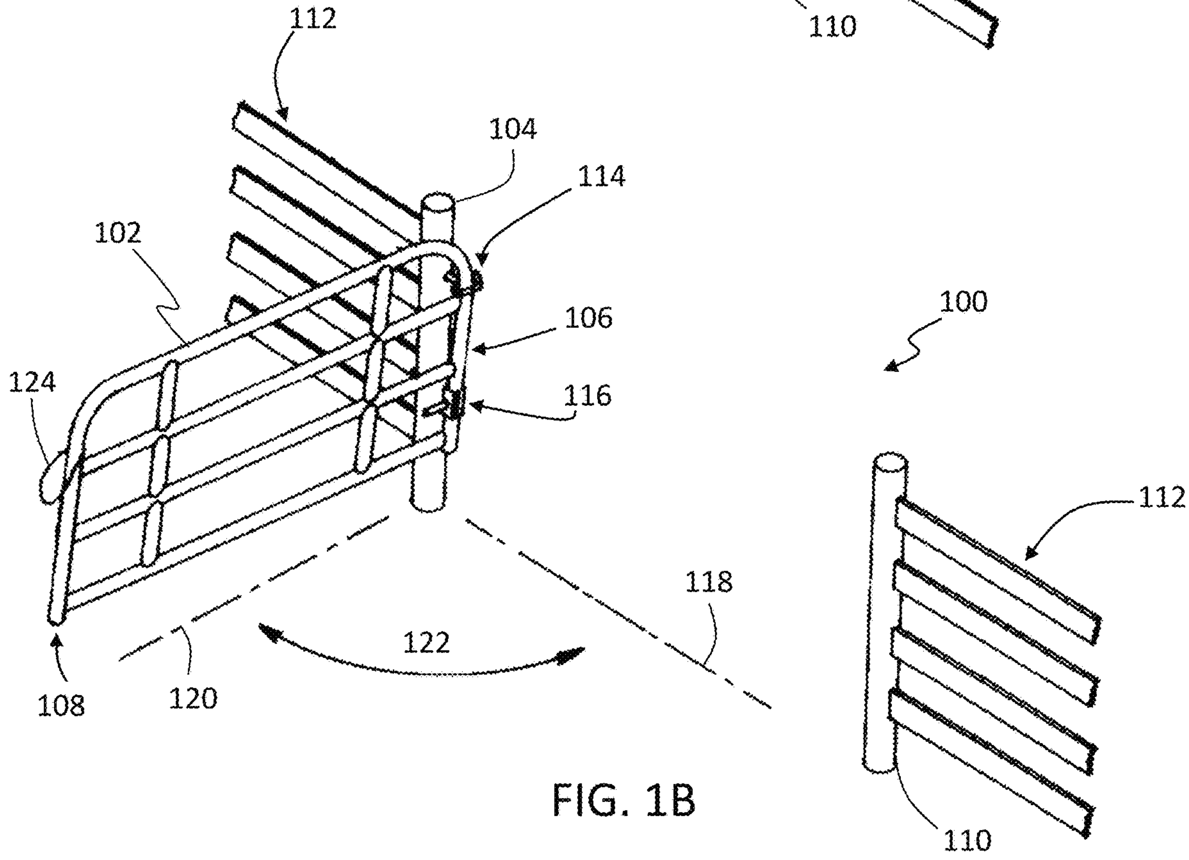
FIG. 1B is a schematic illustration of the gate system of FIG. 1A, shown in an open state.

Referring to FIGS. 1A-1B, schematic illustrations of a gate system 100 that may incorporate embodiments of the present disclosure are shown. The gate system 100 includes a gate 102 that is hingedly supported on a first post 104 at a first end 106 and has a free second end 108 that may selectively attach to a second post 110. The first post 104 and the second post 110 may be part of a fence 112 Although shown in FIGS. 1A-1B as a fence 112, it will be appreciated that the gate system 100 may be incorporated into other structures, such as at the opening of a building (e.g., barn or the like) or other type of wall. Further, in some configurations, the gate system 100 may be provided independent from the fence 112 or other similar structures, and thus may be a free-standing gate.

The gate 102 of the gate system 100 is supported on the first post 104 by a first hinge 114 and a second hinge 116. The hinges 114, 116 of the gate system 100 may be substantially the same or may be configured with different features or functionality, depending on the specific configuration of the gate system 100, as will be appreciated by those of skill in the art. The gate 102 is rotationally supported on the first post 104 and can be moved or swung from a first position (e.g., closed position) indicated by line 118 in FIG. 1B and a second position (e.g., open position) indicated by line 120 in FIG. 1B. The gate 102 may be swung through an angle 122, illustrated in FIG. 1B, between the first position 118 and the second position 120. At the second end 108 of the gate 102, a securing mechanism 124 may optionally be provided to secure the gate 102 in the closed position 118 (e.g., as shown in FIG. 1A).

The hinges 114, 116 may be securely attached to the first post 104 by various mechanisms, as will be appreciated by those of skill in the art. In some configurations, the hinges 114, 116 are engaged with the first post 104 through a threaded connection between a portion of the respective hinge 114, 116 and the first post 104. In some configurations, and in accordance with some embodiments of the present disclosure, the hinges 114, 116 may threadedly screw into the material of the first post 104.

For example, in accordance with some non-limiting embodiments of the present disclosure, easy install self-tapping gate hinges are provided. The gate hinges may include a dual-sided gate hinge body having two support arms. In accordance with some embodiments, gate hinges of the present disclosure may have an anchor shaft or body and the two support arms extend therefrom in a substantially “t” or “T” shape. The anchor shaft or body may include features for engaging and securing to a support post, such as a threaded feature, a self-tapping feature, or the like. The support arms of the gate hinge provide a shaft or structure on to which a portion of the gate may be placed. With the gate installed over one of the support arm, a locking pin (e.g., cotter pin) may be passed through a locking aperture of the gate hinge support arm and a locking aperture of the gate to provide a secured connection therebetween (e.g., to prevent the gate from dislodging from the gate hinge). For example, each hinge support arm may include a single hole approximately ¼ inch from a top side of the respective support arm. These holes are for the locking pin to pass through an prevent the gate from being inadvertently knocked off the hinge.

As noted, the gate hinge may have an anchor shaft or body from which the support arms extend. At one end of the anchor shaft is a post-engagement end and at the opposite end is a tool-engagement end. The post-engagement end may include threading of the like for installing the gate hinge to a support post. The tool-engagement end may include features to engage with a tool or the like for installing the gate hinge to the support post, uninstalling the gate hinge from the support post, and/or adjusting the gate hinge after installation. In accordance with some embodiments, a center of the tool-engagement end (along an axis there through) may include a recess, depression, slot, hole or the like. The recess can provide access for a driver tool to be used to set, screw, and/or unscrew the anchor shaft into the support post. In some embodiments, at a junction between the support arms and the anchor shaft, a seat may be provided for receiving and supporting a portion of the gate, such as a bracket or sleeve.

Figure 2:
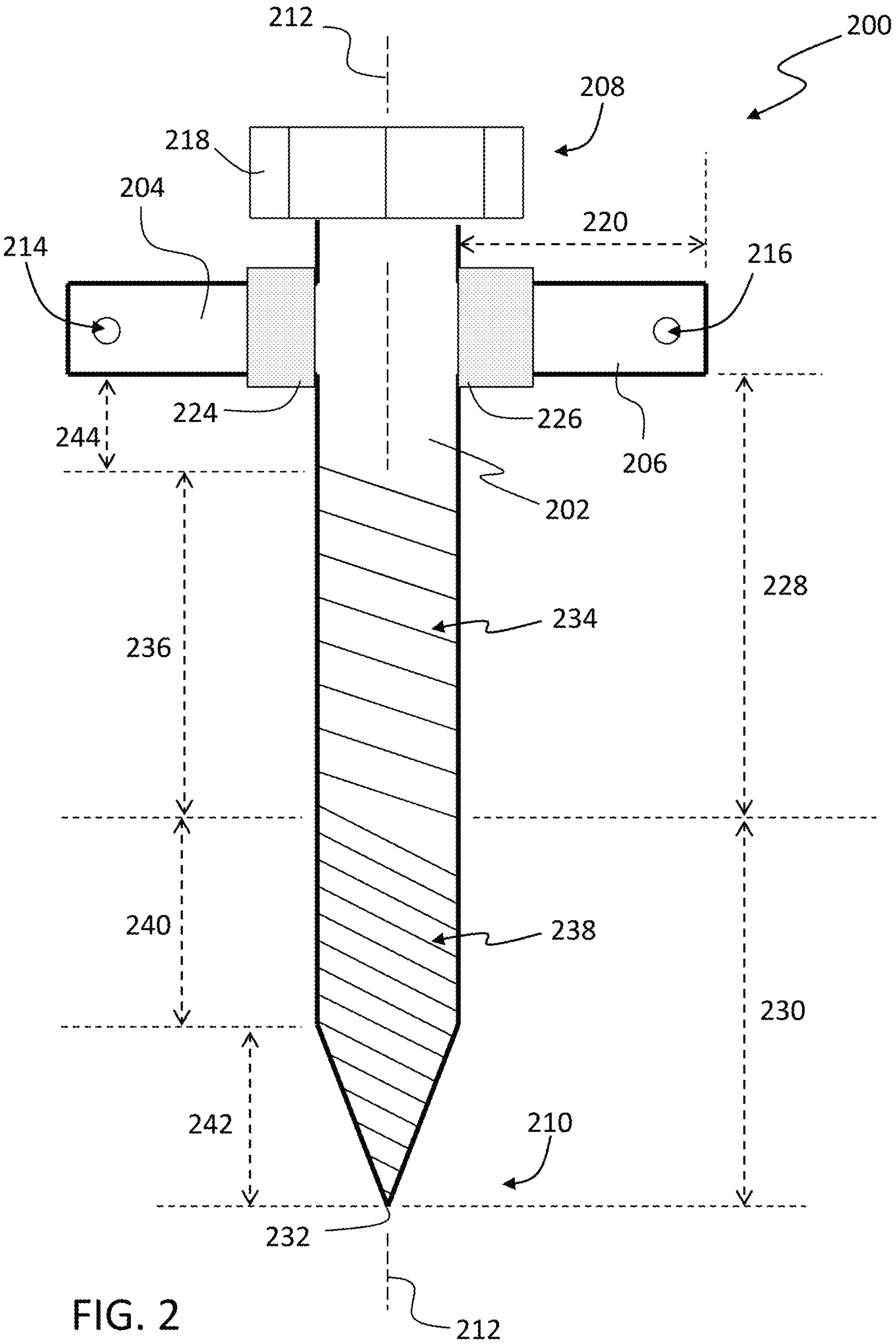
FIG. 2 is a schematic illustration of a gate hinge in accordance with an embodiment of the present disclosure.

Referring now to FIG. 2, a schematic illustration of a gate hinge 200 in accordance with an embodiment of the present disclosure is shown. The gate hinge 200 may be used in the gate system 100 of FIGS. 1A-1B and may be used for the hinges 114, 116 illustrated therein. The gate hinge 200 is configured to be installed into a support post or the like and includes features for biting into and securing to material of the support post (e.g., a wooden post or the like). The gate hinge 200 includes an anchor shaft 202, a first support arm 204, and a second support arm 206. The anchor shaft 202 may be a solid body structure (e.g., not hollow) and extends in an axial direction between a tool-engagement end 208 and a post-engagement end 210 and defines a shaft axis 212. The first support arm 204 extends in a direction normal to the shaft axis 212 and at a position closer to the tool-engagement end 208 than the post-engagement end 210. The second support arm 206 extends in a direction normal to the shaft axis 212 form a position along the shaft axis 212 that is axial the same as the first support arm 204 and opposite therefrom. As a result, the gate hinge 200 has a substantially "t" or "T" shape, as shown.

The tool-engagement end 208 of the gate hinge 200 includes a tool head 218. The tool head 218 is a structure for receiving and engaging with a tool for installation, removal, and/or adjustment of the gate hinge 200 with respect to a support post or the like. In this illustrative configuration, the tool head 218 extends away from the junction with the support arms 204, 206. The tool head 218, as shown, may be a hex-type bolt head that may be engaged with a ratchet tool, a wrench, or the like. In this configuration, the tool head 218 is a positive structure of material at the tool-engagement end 208. In other embodiments, the tool head 218 may be arranged as a recess, depression, or hole at the tool-engagement end 208 for receiving a tool therein (e.g., a screwdriver, hex key, etc.). When the tool-engagement end 208 is engaged by an appropriate tool, the gate hinge 200 may be rotated about the shaft axis 212.

As shown, the first support arm 204 includes a respective pin hole 214 at a distal end thereof. Similarly, the second support arm 206 includes a respective pin hole 216 at a distal end thereof. The distal ends of the support arms 204, 206 are ends of the support arms 204, 206 and a base of the respective the support arms 204, 206 is defined at the joining or junction with the anchor shaft 202. The pin holes 214, 216 are provided to receive a locking pin (e.g., cotter pin) when a portion a portion of a gate is arranged over the respective support arm 204, 206. When the gate is installed on the respective support arm 204, 206, a hole or aperture in the structure of the gate may align with the respective pin hole 214, 216 and thus the two structures may be secured together. Each support arm 204, 206 may be substantially the same, and extend a length 220 from the anchor shaft 202. The length 220 may be, for example, and without limitation, between 1 and 5 inches, or, in some embodiments, between 1.5 and 2 inches in length. The pin holes 214, 216 may be arranged generally centrally on the respective support arms 204, 206. The support arms 204, 206 may be cylindrical in shape and have an axis therethrough that is normal to the shaft axis 212. In one non-limiting embodiment, the support arms 204, 206 may have a diameter of ⅝ inch, and the respective pin holes 214, 216 may be ⅛-inch holes.

As shown, an optional seat 224, 226 may be arranged at a base or junction between the respective support arms 204, 206 and the anchor shaft 202. That is, the base of the support arms 204, 206 is defined where the support arms 204, 206 extend outward from the anchor shaft 202. The seats 224, 226 may be integrally formed with the material of the gate hinge 200 (e.g., may be welds or the like) or may be separate structures installed to the base of each support arm 204, 206. In some embodiments, the seats 224, 226 may be formed of a material different from the rest of the gate hinge 200, such as from a plastic, rubber, metal, or the like. The seats 224, 226 may provide a surface or structure to which a portion of a gate may rest and contact when installed to the gate hinge 200. The seats 224, 226 may be arranged to extend along an axial length of the respective support arms 204, 206 a distance that is greater than a length or extent of the tool head 218 in the same direction. That is, the seats 224, 226 may provide a contact surface for a portion of a received gate and the length and/or position of the seats may be set to prevent the tool head 218 from interfering with operation (e.g., opening and closing) of a gate supported on the gate hinge 200.

As shown, the anchor shaft 202 of the gate hinge 200 may be defined as having an intermediate portion 228 and an end portion 230. The intermediate portion 228 may have a substantially uniform diameter that extends from the base of the support arms 204, 206 toward the post-engagement end 210. The end portion 230 extends from the intermediate portion 228 to a tip 232 at an end of the gate hinge 200 at the post-engagement end 210 thereof.

The intermediate portion 228 includes a first thread 234. The first thread 234 has an axial length 236. That is, the first thread 234 may extend for an axial distance along the anchor shaft 202 for the axial length 236. In accordance with some embodiments, the axial length 236 of the first thread 234 may be a length less than an axial length of the intermediate portion 228, and thus the intermediate portion 228 may include a threaded portion defined by the first thread 234 and an unthreaded portion that is between the first thread 234 and the base of the support arms 204, 206. In other embodiments, the axial length 236 of the first thread 234 may be equal to a full axial length of the intermediate portion 228 (i.e., extend from the base of the support arms 204, 206 to the end portion 230).

The end portion 230 extends from the intermediate portion 228 to the tip 232. The end portion 230 includes a second thread 238 that extends to the tip 232. The end portion 230 may be defined in two sections, with a first section 240 having a uniform size (e.g., diameter) along the axial length thereof and a second section 242 that tapers from an end of the first section 240 to the tip 232. The second thread 238 may be provided on both the first section 240 and the second section 242 and extend to the tip 232.

In accordance with some embodiments of the present disclosure, the first thread 234 and the second thread 238 may be configured with different properties. For example, the first thread 234 may have a relatively coarse threading (e.g., ⅛-inch thread pitch) and the second thread 238 may have a relatively fine threading (e.g., 1/16-inch thread pitch). That is, the first thread 234 may have a thread spacing or thread pitch that is greater than a thread spacing or thread pitch of the second thread 238. Stated another way, in accordance with some embodiments, the first thread 234 may have fewer threads per inch than the second thread 238. Thread pitch is the distance between corresponding points on adjacent threads along an axis of the threaded body.

In some configurations, the second thread 238 may define a self-tapping thread. A self-tapping thread (or screw) is a structure that can tap its own hole as it is driven into a material, such as a support post or the like (e.g., first post 104 shown in FIGS. 1A-1B). The self-tapping thread is a type of thread-cutting arrangement intended to produce a thread in relatively soft material or sheet materials. In other embodiments, the second thread 238 may define the structure of a self-drilling screw or a thread rolling screw. The relatively fine threading of the second thread 238 is selected to perform a self-tapping function and start the threading of the gate hinge 200 into a post or other structure. Once the threading is started and the gate hinge 200 enters the post or other structure, the relatively coarser first thread 234 provides threaded engagement with the material to hold and secure the gate hinge 200 in the post or other structure. The increase in thread size or spacing of the first thread 234 relative to the second thread 238 may be set to ensure that the anchor shaft 202 is held securely in the post or structure and does not disengage from the post or structure (e.g., slide out).

During installation, a user may place the tip 232 into contact with a surface of a support post or the like. The user can then drive the gate hinge 200 into the material of the support post. The second thread 238 will bite into the material of the support post. A user may use a tool to engage with the tool head 218 and rotate the gate hinge 200 about the shaft axis 212. The second thread 238 will enter into the material of the support post first, followed by the first thread 234 which may be rotationally driven by a tool engaged with the tool head 218. When fully installed, one of the support arms 204, 206 will be oriented upward and parallel with a direction of the support post. The other of the support arms 204, 206 will be oriented 180 degrees opposite the upward facing support arm 204, 206. In some embodiments, a portion 244 of the intermediate portion 228 may be unthreaded (e.g., unthreaded section) and may provide for a gap between the supports arms 204, 206 and the material of the support post, such that the support arms 204, 206 do not contact the support post. The resulting gap allows for a portion of a gate (e.g., sleeve or bracket) to fit over the upward facing support arm 204, 206 without contacting the support post.

In one non-limiting example of a gate hinge in accordance with the present disclosure, the gate hinge 200 may have a length 220 of the support arms 204, 206 of about 2 inches with a diameter of about ⅝ inch. In some embodiments, the anchor shaft 202 may have a diameter of about ⅝ inch for the length of the anchor shaft 202 from the tool head 218 to the beginning of the tapering second section 242 of the end portion 230. In other embodiments, the anchor shaft 202 may have a variable diameter, with the intermediate portion 228 having a diameter of ⅝ inch at a maximum and ⅜ inch at a minimum, with a narrowing tapering extending in a direction from the tool-engagement end 208 toward the post-engagement end 210. In some non-limiting embodiments, the combined axial length of the first thread 234 and the first section 240 of the end portion 230 may be about 3 inches. In such a configuration, the axial length 236 of the first thread 234 along the anchor shaft 202 may be 1 inch and the axial length of the first section 240 of the end portion 230 may be about 2 inches. Furthermore, in some embodiments, the axial length of the end portion 230 may be about 3 inches, and in such configurations, the first section 240 and the second section 242 may each be about 1.5 inches. The tapering portion of the second section 242 may taper from a diameter of about ⅜ inch at the first portion 240 and taper to about 1/16 inch at the tip 232.

In accordance with non-limiting embodiments of the present disclosure, the gates hinges described herein may be formed from a variety of materials. For example, and without limitation, the gate hinges may be made from various metals and/or composite materials. In accordance with a non-limiting embodiment, the entirety of the gate hinge may be made from chromium vanadium steel, which can provide for high torque resistance. Such high torque resistance can withstand the resistance and high torques produced by high impact torque tools and the like. Other high torque resistant materials may be used, such as steel, steel alloys, iron, and the like. Further, in some embodiments, depending on the specific application, the gate hinges may be formed from high strength composite materials or the like.

Figure 3:
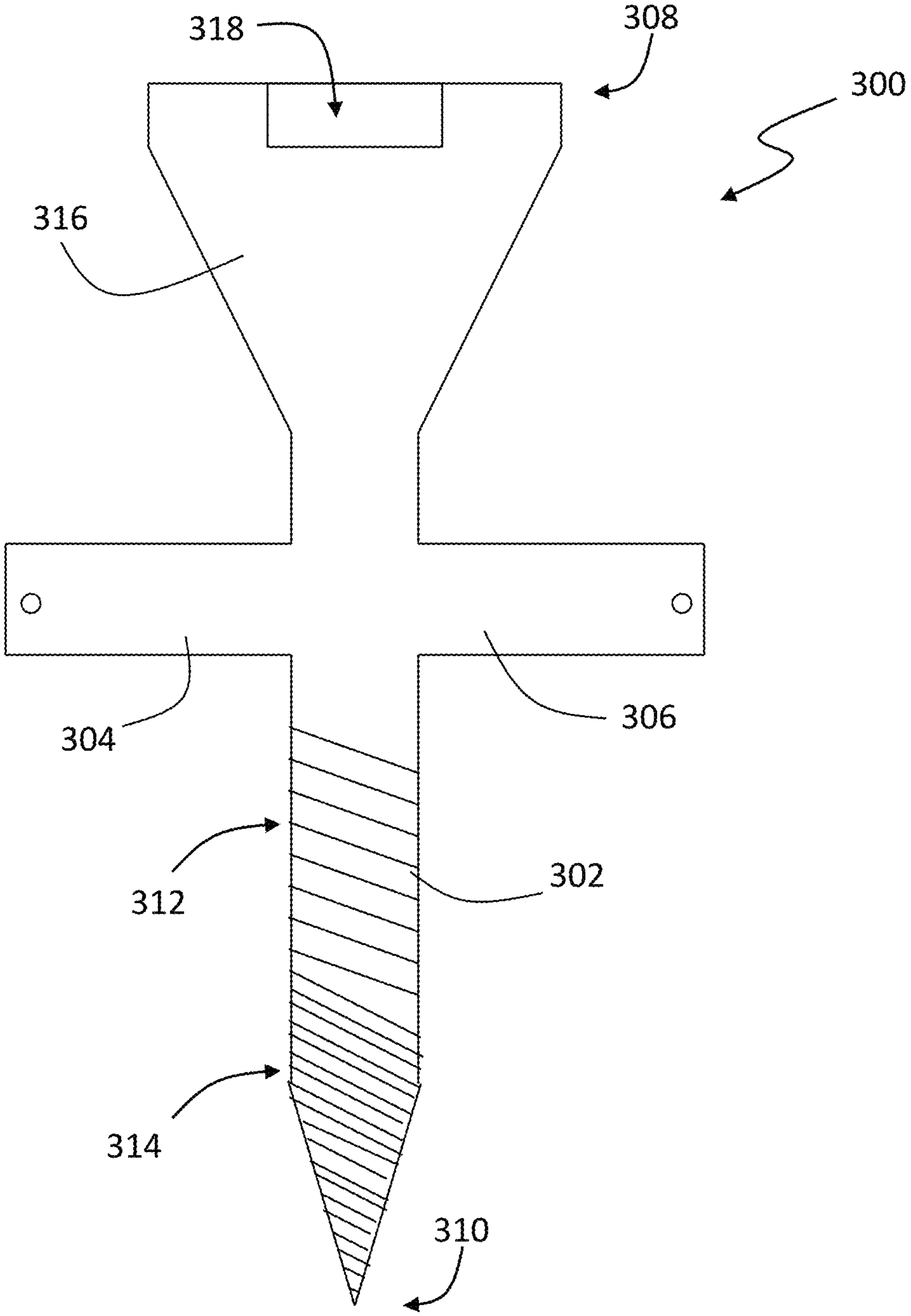
FIG. 3 is a schematic illustration of a gate hinge in accordance with another embodiment of the present disclosure.

Referring now to FIG. 3, a schematic illustration of a gate hinge 300 in accordance with an embodiment of the present disclosure is shown. The gate hinge 300 may be used in the gate system 100 of FIGS. 1A-1B and may be used for the hinges 114, 116 illustrated therein. The gate hinge 300 is configured similarly to that shown and described above with respect to FIG. 2, and thus similar features may not be shown or described for simplicity and ease of explanation. The gate hinge 300 includes an anchor shaft 302, a first support arm 304, and a second support arm 306. The anchor shaft 302 extends in an axial direction between a tool-engagement end 308 and a post-engagement end 310. The anchor shaft 302 includes a first thread 312 and a second thread 314, similar to that shown and described above. That is, the first thread 312 may have a relatively coarse threading and the second thread 314 may be a self-tapping thread.

In this illustration, the gate hinge 300 includes a tool head 316 at the tool-engagement end 308. Rather than the positive feature of FIG. 2, the gate hinge 300 includes a tool head 316 having a recess 318 that is configured to receive a tool. The recess 318 may be sized and shaped to receive a screwdriver head, a hex key, or the like. It will be appreciated that in some embodiments, the tool head may have both positive (e.g., as shown in FIG. 2) and negative (e.g., as shown in FIG. 3) features, such that multiple different tools may be useable with the gate hinge.

Figure 4:
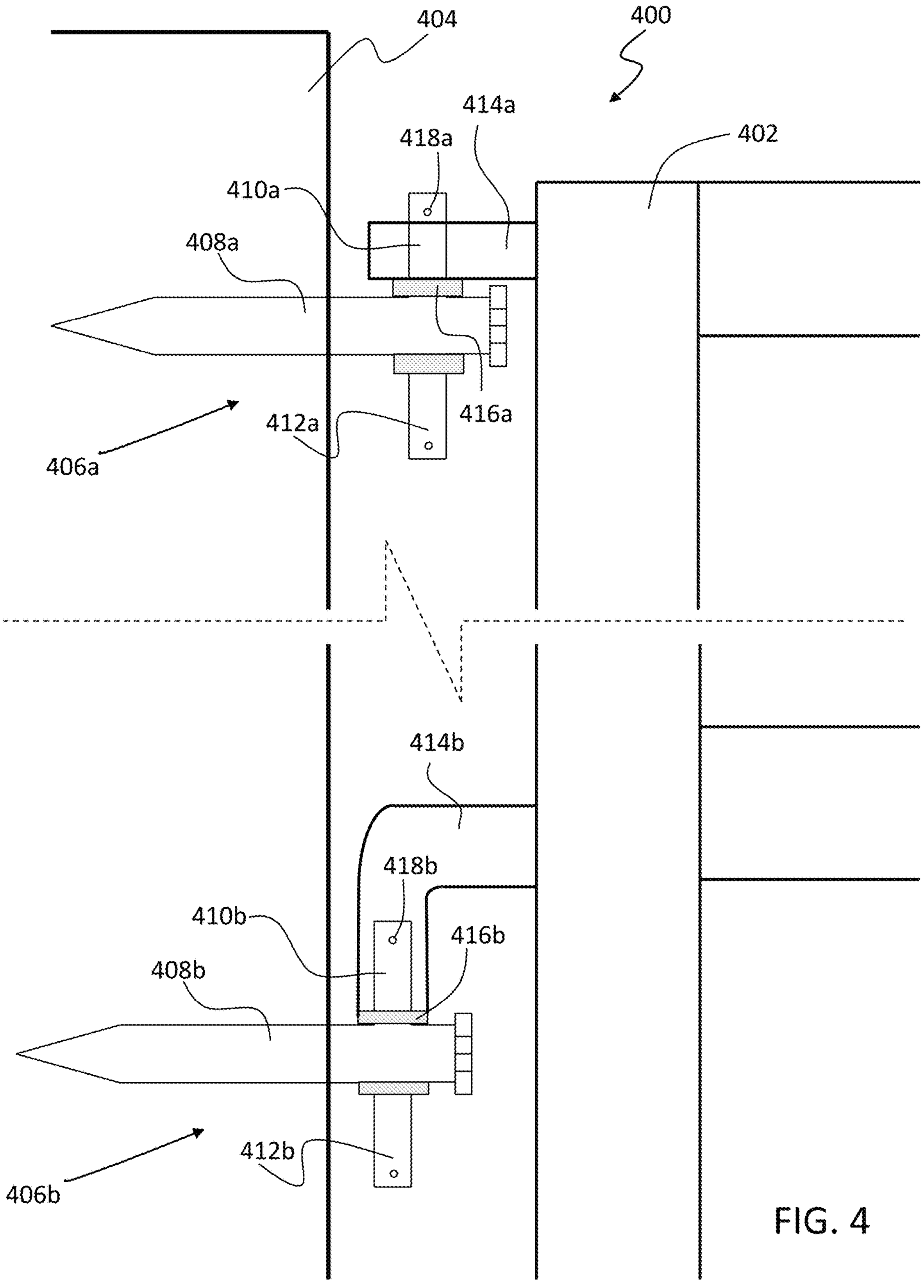
FIG. 4 is a schematic illustration of a gate supported on a post using a gate hinge in accordance with an embodiment of the present disclosure.

Referring now to FIG. 4, a schematic illustration of a portion of a gate system 400 in accordance with an embodiment of the present disclosure is shown. The gate system 400 includes a gate 402 that is hingedly supported on a post 404, similar to that shown in FIGS. 1A-1B. The gate 402 is rotationally mounted or supported on the post 404 by a first gate hinge **406*a* and a second gate hinge 406*b*. The gate hinges 406*a*, 406*b* may be similar to the above-described embodiments, having a dual-threaded configuration (e.g., coarse threads and self-tapping threads) on respective anchor shafts 408*a*, 408*b*. The gate hinges 406*a*, 406*b* include respective first support arms 410*a*, 410*b* and respective second support arms 412*a*, 412*b* extending in opposite directions from the respective anchor shaft 408*a*, 408*b***.

As shown, the gate 402 includes a first gate mount **414*a* and a second gate mount 414*b*. The first gate mount 414*a* and the second gate mount 414*b* have different geometric and structural configurations, but both configurations are able to be used with the gate hinges 406*a*, 406*b*, and other gate hinges as shown and described herein. The first gate mount 414*a* may be a substantially linear extension or structure that extends from the gate 402 toward the post 404. The first gate mount 414*a* may have a central through hole or aperture that may be fit over the first support arm 410*a* of the first gate hinge 406*a* and may be supported thereon. The second gate hinge 414*b* has a tubular configuration or sleeve-like structure that fits over the first support arm 410*b* of the second gate hinge 406*b***.

A portion of the first gate mount **414*a* may fit over the first support arm 410*a* of the first gate hinge 406*a* such that an end of the first support arm 410*a* of the first gate hinge 406*a* extends through or above the first gate mount 414*a*. In this configuration, the first gate mount 414*a* rests on a first seat 416*a* of the first gate hinge 406*a* such that during operation (e.g., rotation) of the gate 402, a tool end or tool head of the first gate hinge 406*a* does not interfere with the rotation thereof. In this configuration, the first support arm 410*a* includes a respective first pin hole 418*a*** for receiving a pin, such as a locking pin or cotter pin.

With respect to the second gate hinge **406*b*, an end of the second gate mount 414*b* is bent such that a portion of the second gate mount 414*b* may slide over and enclose the first support arm 410*b* of the second gate hinge 406*b*. As shown, the second gate mount 414*b* may rest on a respective second seat 416*b* of the first support arm 410*b* of the second gate hinge 406*b*. A locking pin, cotter pin, or the like may be installed through a first pin hole 418***b* of the second support arm 410*b* for use with a gate mount having a configuration similar to the first gate mount 414*a*. In the configuration of the second gate hinge 406*b*, the seat 416*b* may, optionally, be omitted from the second gate hinge 406*b* because the curved or bent structure of the second gate mount 414*b* will not interact with a tool head or tool end of the second gate hinge 406*b*.

Figure 5:
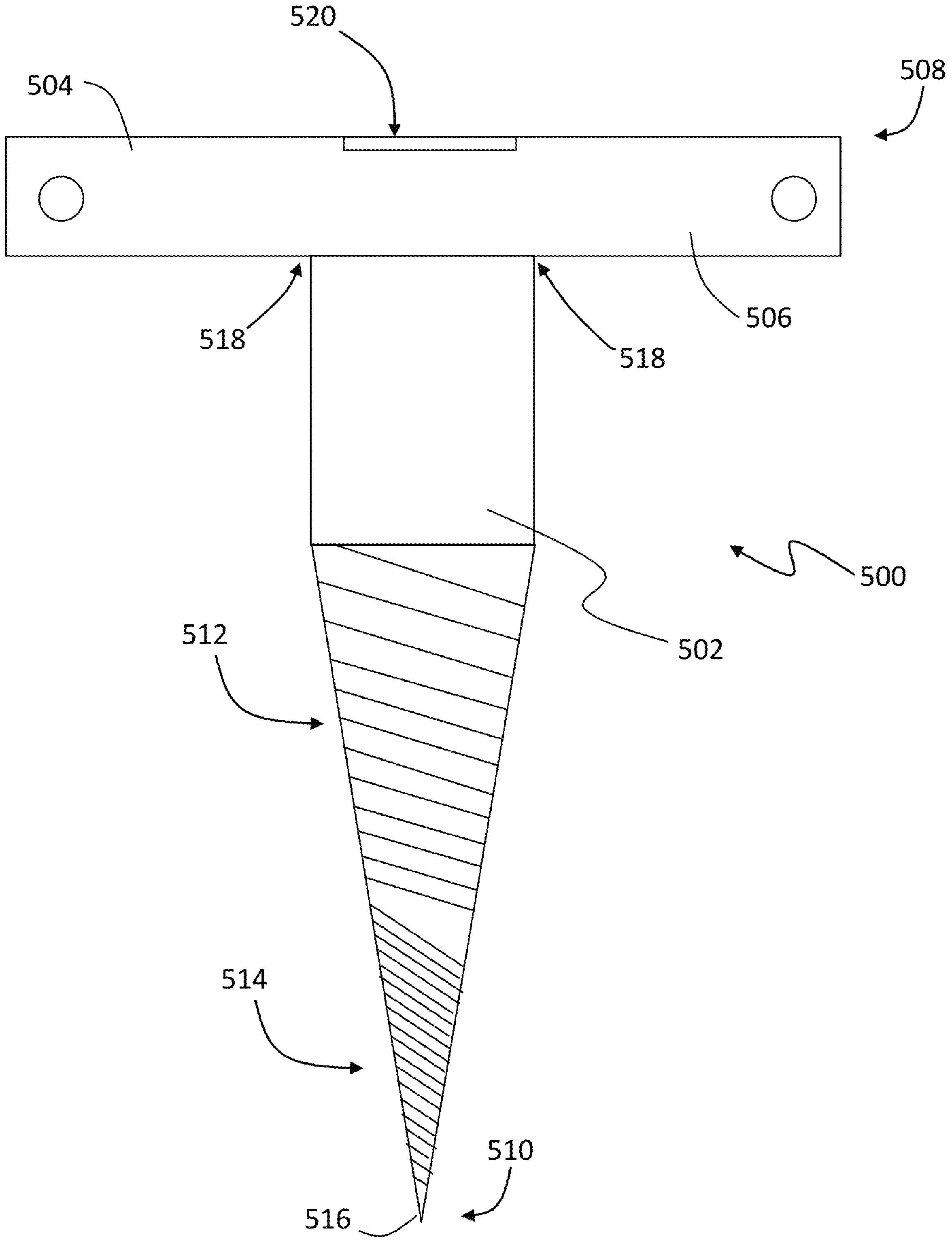
FIG. 5 is a schematic illustration of a gate hinge in accordance with another embodiment of the present disclosure.

Referring now to FIG. 5, a schematic illustration of a gate hinge 500 in accordance with an embodiment of the present disclosure is shown. The gate hinge 500 may be used in the gate system 100 of FIGS. 1A-1B and may be used for the hinges 114, 116 illustrated therein. The gate hinge 500 is configured similarly to that shown and described above with respect to FIGS. 2-3, and thus similar features may not be shown or described for simplicity and ease of explanation. The gate hinge 500 includes an anchor shaft 502, a first support arm 504, and a second support arm 506. The anchor shaft 502 extends in an axial direction between a tool-engagement end 508 and a post-engagement end 510. The anchor shaft 502 includes a first thread 512 and a second thread 514, similar to that shown and described above. That is, the first thread 512 may have a relatively coarse threading and the second thread 514 may be a self-tapping thread. In this configuration, the anchor shaft 502 has a continuous taper or continuously tapers from a junction with the support arms 504, 506 to a tip 516 of the post-engagement end 510. That is, in this embodiment, the anchor shaft 502 does not include a substantially cylindrical portion, but rather is substantially conical for the axial length thereof. Further, in this embodiment, separate seat structures or elements are not provided, but rather seats 518 are defined at the intersection of the material of the support arms 504, 506 with the anchor shaft 502. Furthermore, in this embodiment, the tool-engagement end 508 does not extend axially from the anchor shaft 502 beyond the support arms 504, 506. In this configuration, the tool-engagement end 508 includes a recess 520 that is configured to receive a tool, similar to the configuration described with respect to FIG. 3.

In view of the above, it will be appreciated that the gate hinges described herein may incorporate various features to improve use of gates and mounting and supporting gates to a support post. The gate hinges described herein may include a dual-support arm configuration such that the gate hinge structure can balance forces applied thereto during installation and use. Furthermore, inclusion of a tool-engagement end improves installation operations by allowing for a tool to be used to fully install the gate hinge into a post or the like. Additionally, advantageously, by including a self-tapping feature in the threads of the gate hinge, installation may become easier to perform. It will further be appreciated that the structures, features, and aspects of the different illustrated embodiments may be combined with each other (e.g., between different embodiments) to form a gate hinge structure that is not explicitly shown and described but incorporates features from one or more of the disclosed configurations. For example, and without limitation, in some embodiments, the tool-engagement end 508 having the recess 520 shown in FIG. 5 may be implemented with the other features and structures of the embodiment shown in FIG. 2. In such a configurations, the tool head 218 may be incorporated into the material of the region where the anchor shaft 202 ends at a top side that is level with a top surface of the support arms 204, 206. In such a configuration, the tool head 218 may be a recessed feature similar to that shown in FIG. 5, and a portion of the anchor shaft 202 may not extend beyond such point. In some such configurations, the seats (e.g., seats 224, 226) may be omitted. Other combinations of features and structures may be interchanged or included without departing from the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A gate hinge comprising:

an anchor shaft defining a shaft axis that extends between a first end and a second end;

a first support arm arranged at a position closer to the first end than the second end, wherein the first support arm extends in a direction normal to the shaft axis from the anchor shaft, wherein the first support arm is configured to receive and support a portion of a gate;

a second support arm arranged at a same axial position as the first support arm along the anchor shaft and extends in a direction opposite the first support arm, wherein the second support arm is configured to receive and support a portion of a gate; and a seat at a base of each of the first support arm and the second support arm, wherein the base is defined where the respective support arm joins the anchor shaft, wherein the anchor shaft comprises a first thread and a second thread, wherein the second thread is formed on the anchor shaft and extends to the second end of the anchor shaft, wherein the first thread is formed along the anchor shaft for at least a portion of an axial length between the first and second support arms and the second thread, and the second thread extends axially from the first thread to a tip of the anchor shaft, and wherein the second thread comprises a self-tapping thread.

2. The gate hinge of claim 1, wherein the first thread has a thread pitch that is greater than a thread pitch of the second thread.

3. The gate hinge of claim 1, wherein the anchor shaft comprises an intermediate portion and an end portion, wherein end portion is defined toward the second end of the anchor shaft and the intermediate portion extends from (i) a junction between the first and second support arms with the anchor shaft to (ii) the end portion.

4. The gate hinge of claim 3, wherein the first thread is arranged on the intermediate portion and the second thread is arranged on the end portion.

5. The gate hinge of claim 3, wherein the intermediate portion comprises an unthreaded section and the first thread, wherein the unthreaded section is arranged between the junction and the first thread.

6. The gate hinge of claim 3, wherein the end portion comprises a tapering section that ends at the tip.

7. The gate hinge of claim 6, wherein the tapering portion includes at least a portion of the second thread.

8. The gate hinge of claim 1, wherein each seat is integrally formed with the material of the respective support arm and the anchor shaft.

9. The gate hinge of claim 1, wherein each seat is a separate element installed to the respective support arm.

10. The gate hinge of claim 1, further comprising a pin hole arranged at a distal end of each of the first support arm and the second support arm.

11. The gate hinge of claim 1, wherein the anchor shaft continuously tapers from a base of the first and second support arms to the tip.

12. The gate hinge of claim 1, wherein the first end comprises a tool-engagement feature and the second end comprises a post-engagement feature.

13. The gate hinge of claim 12, wherein the tool-engagement feature comprises a tool head.

14. The gate hinge of claim 12, wherein the tool-engagement feature comprises a recess formed in the first end.

15. The gate hinge of claim 12, wherein the post-engagement feature comprises the second thread.

16. The gate hinge of claim 1, wherein the anchor shaft comprises a section of uniform diameter and a section that tapers to the tip.

17. The gate hinge of claim 1, wherein the anchor shaft is formed from chromium vanadium steel.

18. The gate hinge of claim 1, further comprising a tool head at the first end, wherein the tool head extends axially in a direction away from the first and second support arms and opposite the tip.

19. The gate hinge of claim 1, wherein the first thread and the second thread have equal axial lengths along the anchor shaft.

* * * * *